UNITED STATES PATENT OFFICE.

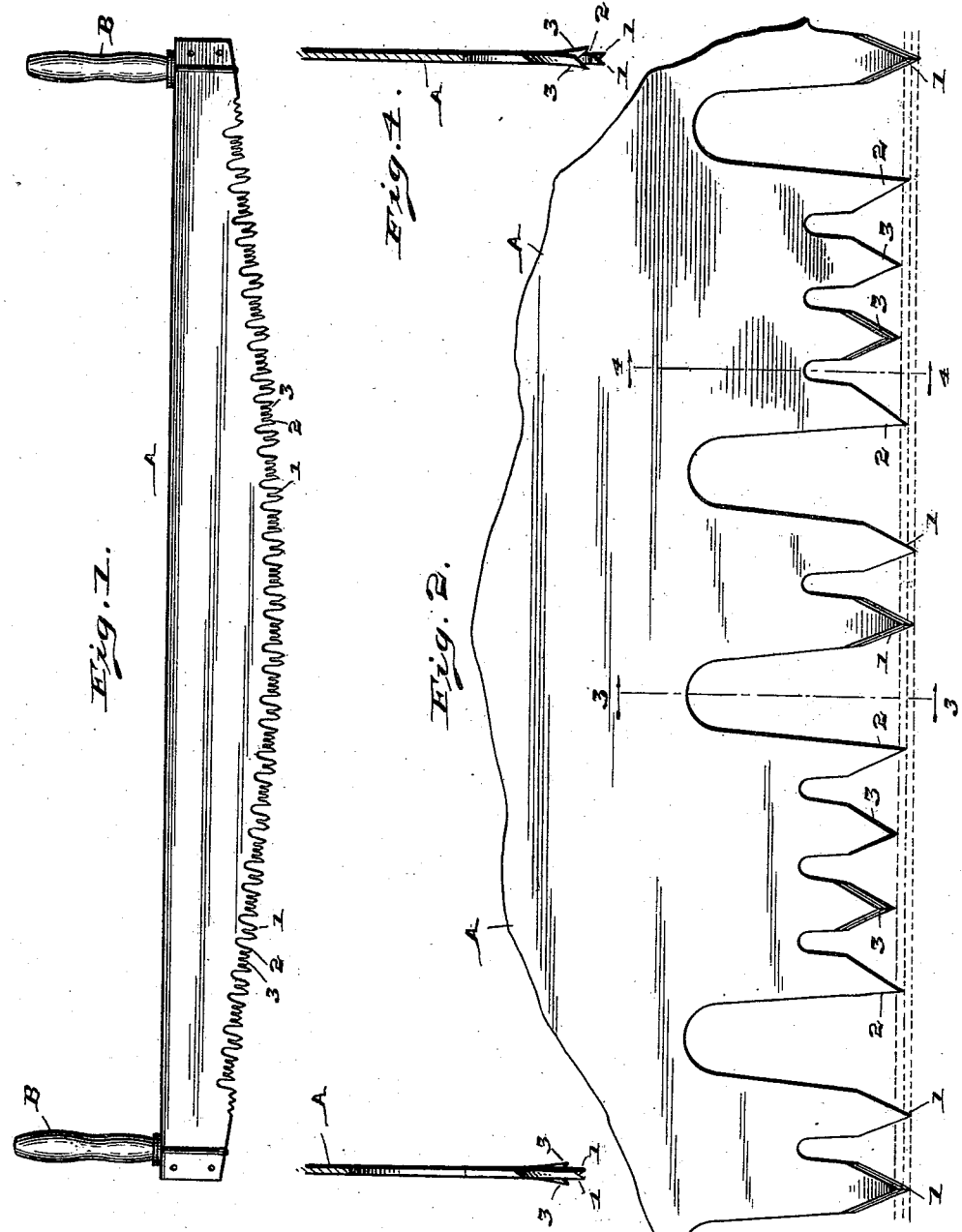

JOHN W. MORRIS, OF INDIANAPOLIS, INDIANA, ASSIGNOR OF ONE-HALF TO CHARLES S. BRONSON, OF SAME PLACE.

CROSSCUT-SAW.

SPECIFICATION forming part of Letters Patent No. 542,420, dated July 9, 1895.

Application filed December 18, 1894. Serial No. 532,179. (No model.)

*To all whom it may concern:*

Be it known that I, JOHN W. MORRIS, a citizen of the United States, residing at Indianapolis, in the county of Marion and State of Indiana, have invented certain new and useful Improvements in Crosscut-Saws, of which the following is a specification.

The object of my present invention is to produce a crosscut-saw which will run very steadily in use, and thus obviate the well-known fault in most saws of this character of trembling in the kerf, which manifestly is disadvantageous to the operation of the saw. I do this by a certain peculiar arrangement and formation of the teeth, as will be hereinafter more particularly described and claimed.

Referring to the accompanying drawings, which are made a part hereof and on which similar letters of reference indicate similar parts, Figure 1 is a side elevation of a crosscut-saw with teeth formed and arranged in accordance with my invention; Fig. 2, a fragmentary view of such a saw on a much larger scale, showing substantially the full size of the teeth as ordinarily constructed; and Figs. 3 and 4 transverse sectional views on the dotted lines 3 3 and 4 4, respectively, in Fig. 2, looking in the direction indicated by the arrows at the ends of such lines.

The saw-blade A is provided with the usual handles B, and has formed upon its cutting-edge the advance or primary cutting-teeth 1, the clearing-teeth 2, and the secondary cutting and kerf-widening teeth 3. The respective lengths of these teeth are best shown in Fig. 2, where dotted lines are arranged intersecting their points, in order to make the variations in length more clearly apparent upon casual inspection. The advance or primary cutting teeth 1 are the longest, the clearing-teeth 2 come next, while the secondary cutting and kerf-widening teeth 3 are the shortest, the difference between the first and second and second and third of these said teeth being about the same; and I have found in practice that a variation of one-sixteenth of an inch between each set of teeth, making a total of one-eighth of an inch between the longest and the shortest teeth, is a desirable difference in actual operation. The advance or primary cutting-teeth 1 are simply filed sharp, and are not "set" at all. The clearing-teeth 2 are of the ordinary form, and also are not set. The secondary cutting and kerf-widening teeth 3 are set somewhat, as shown in Figs. 3 and 4. The operation is, in sawing, that the advance or primary cutting-teeth 1 enter about an eighth of an inch into the cut before the kerf-widening teeth begin operation at all, and these teeth 1 being no thicker than the plate from which they are formed there is no waste room to permit trembling of the saw, and they consequently cut much more rapidly and easily than if they were set, in proportion to the number of teeth engaged. The secondary cutting and kerf-widening teeth 3 then come into operation, trimming down the sides of the kerf and widening it to the necessary width to prevent binding of the saw-blade after the kerf has been cut so deep as would otherwise result in causing such binding, being in this respect more similar to the operation of all the cutting-teeth in ordinary saws. The clearing or raking teeth 2 simply clear or rake out the sawdust produced by the cutting-teeth 1 and 3 in the ordinary and well-known manner.

I have found by actual experiment and comparison with the best saws of other forms of which I have any knowledge that my saw will cut as rapidly as the best, will run much more steadily, and be operated with less power, while it will run longer without being freshly set, as the teeth 3 wear away less rapidly than the teeth 1.

Having thus fully described my said invention, what I claim as new, and desire to secure by Letters Patent, is—

A cross-cut saw having primary cutting teeth with little or no set, shorter secondary cutting teeth provided with set, and clearing teeth of intermediate length and interposed between said primary and secondary cutting teeth, substantially as set forth.

In witness whereof I have hereunto set my hand and seal, at Indianapolis, Indiana, this 15th day of December, A. D. 1894.

JOHN W. MORRIS. [L. S.]

Witnesses:
CHESTER BRADFORD,
JAMES A. WALSH.